United States Patent [19]
Nakata et al.

[11] Patent Number: 5,459,185
[45] Date of Patent: Oct. 17, 1995

[54] ONE-PART MOISTURE-CURING ORETHANE ADHESIVE

[75] Inventors: Yoshihiro Nakata, Takatsuki; Masaharu Takada, Osaka; Yukio Hayashi, Kyoto, all of Japan

[73] Assignee: Sunstar Giken Kabushiki Kaisha, Takatsuki, Japan

[21] Appl. No.: 189,770

[22] Filed: Feb. 1, 1994

[51] Int. Cl.$^6$ .................................................. C08K 5/20
[52] U.S. Cl. ..................... 524/227; 524/149; 524/230; 524/297; 524/298; 524/314; 524/423; 524/425; 524/451; 524/500; 524/590
[58] Field of Search ................................. 524/227, 230, 524/265, 590, 500, 423, 425, 451, 149, 297, 298, 314

[56] References Cited

U.S. PATENT DOCUMENTS

| | | | |
|---|---|---|---|
| 4,443,577 | 4/1984 | Higgins et al. | 524/590 |
| 5,087,661 | 2/1992 | Aoki et al. | 524/714 |
| 5,288,797 | 2/1994 | Khalil et al. | 524/590 |

FOREIGN PATENT DOCUMENTS

| | | |
|---|---|---|
| 467533 | 1/1992 | European Pat. Off. . |
| 468405 | 1/1992 | European Pat. Off. . |
| 3937732 | 5/1990 | Germany . |
| 4234273 | 4/1993 | Germany . |
| 63-15876 | 1/1988 | Japan . |

OTHER PUBLICATIONS

Derwent Publications Ltd., Database WPI Week 9412, AN 98039 & JP-A-6 049 428 (Sunstar Giken) 22 Feb. 1994.

*Primary Examiner*—Mark Sweet
*Attorney, Agent, or Firm*—Foley & Lardner

[57] ABSTRACT

In a one-part (one-pack) moisture-curing urethane adhesive comprising a urethane prepolymer having isocyanate groups (NCO) at the terminus, said urethane prepolymer being a reaction product of a polyol and an excess amount of a polyisocyanate, the improvement which comprises adding 0.01 to 5% by weight of a gelling agent based on the whole amount of the adhesive, and optionally adding a thermoplastic urethane multi-block copolymer resin and a thixotropic agent selected from the group consisting of a hydrophilic colloidal silica and a polysiloxane-polyoxyalkylene copolymer. The adhesive of the present invention can obviate float or slippage of glass in the adhesive application of window glass of automobiles.

16 Claims, No Drawings

ONE-PART MOISTURE-CURING ORETHANE ADHESIVE

The present invention relates to a one-part (one-pack) moisture-curing urethane adhesive, more particularly, to a one-part moisture-curing urethane adhesive which can be used for adhesion of, for example, window glass of automobiles, and can obviate float or slippage of glass in a production line of automobiles due to improvement of an initial adhesive strength at a normal temperature.

PRIOR ART

For adhesion of window glass of automobiles, there has been used, for example, a one-part moisture-curing urethane adhesive comprising a urethane prepolymer having isocyanate groups at the terminus, said urethane prepolymer being a reaction product of a polyol and an excess amount of a polyisocyanate. After applying said adhesive to a peripheral portion of window glass, the window glass is then attached to a flange of a body of automobiles with pressure. However, said adhesive does not have a sufficient initial adhesive strength at a normal temperature, and hence, tends to cause float or slippage of glass due to pressure applied when a door is opened or closed and exerts a bad influence upon a production line.

SUMMARY OF THE INVENTION

Under the circumstances, the present inventors have intensively studied in order to improve the initial adhesive strength of the above one-part moisture-curing urethane adhesive, and as a result, have found that a desired initial adhesive strength can be obtained by adding a specific amount of a gelling agent to the adhesive so that a temperature-sensitivity of viscosity is enhanced and the adhesive is made the so-called "hot apply" type which is applied at a temperature of 50° to 100° C., and optionally adding a thermoplastic urethane multi-block copolymer resin which is prepared by reacting a polyfunctional ring-containing and active hydrogen-containing compound, and a diol or triol compound with an equivalent or excess amount of a polyisocyanate compound.

The object of the present invention is to provide in a one-part moisture-curing urethane adhesive comprising a urethane prepolymer having isocyanate (NCO) groups at the terminus, said urethane prepolymer being a reaction product of a polyol and an excess amount of a polyisocyanate, the improvement which comprises adding a gelling agent in an amount of 0.01 to 5% by weight based on the whole amount of the adhesive.

Another object of the present invention is to provide in a one-part moisture-curing urethane adhesive comprising a urethane prepolymer having isocyanate (NCO) groups at the terminus, said urethane prepolymer being a reaction product of a polyol and an excess amount of a polyisocyanate, the improvement which comprises adding a gelling agent in an amount of 0.01 to 5% by weight based on the whole amount of the adhesive; and a thermoplastic urethane multi-block copolymer resin which is prepared by reacting a polyfunctional ring-containing and active hydrogen-containing compound, and a diol or triol compound with an equivalent or excess amount of a polyisocyanate compound.

Still another object of the present invention is to provide in a one-part moisture-curing urethane adhesive comprising a urethane prepolymer having isocyanate (NCO) groups at the terminus, said urethane prepolymer being a reaction product of a polyol and an excess amount of a polyisocyanate, the improvement which comprises adding a gelling agent in an amount of 0.01 to 5% by weight based on the whole amount of the adhesive; a thermoplastic urethane multi-block copolymer resin which is prepared by reacting a polyfunctional ring-containing and active hydrogen-containing compound, and a diol or triol compound with an equivalent or excess amount of a polyisocyanate compound; and a thixotropic agent selected from the group consisting of a hydrophilic colloidal silica and a polysiloxane-polyoxyalkylene copolymer.

These and other objects and advantages of the invention will be apparent to those skilled in the art from the following description.

DETAILED DESCRIPTION OF THE INVENTION

In one aspect of the present invention, the one-part moisture-curing urethane adhesive of the present invention comprises a urethane prepolymer as a main component supplemented with a gelling agent.

The urethane prepolymer used in the adhesive of the present invention is a reaction product of a polyol and an excess amount of a polyisocyanate and contains 1 to 10% (% by weight, hereinafter the same) of NCO groups at the terminus.

The polyol used for preparing the urethane pre-polymer includes, for example, a polyether polyol, a polyester polyol, a polybutadiene polyol, an isoprene polyol, a hydrogenated isoprene polyol, an acryl polyol, castor oil derivatives, tall oil derivative, and the like.

The polyisocyanate used for preparing the urethane prepolymer includes, for example, trimethylene diisocyanate, tetramethylene diisocyanate, hexamethylene diisocyanate, pentamethylene diisocyanate, 2,4,4- or 2,2,4-trimethylhexamethylene diisocyanate, dodecamethylene diisocyanate, 1,3-cyclopentane diisocyanate, 1,4-cyclohexane diisocyanate, 1,3-cyclohexane diisocyanate, 4,4'-methylene bis(cyclohexyl isocyanate), methyl 2,4-cyclohexane diisocyanate, methyl 2,6-cyclohexane diisocyanate, 1,4-bis(isocyanate methyl)cyclohexane, 1,3-bis(isocyanate methyl)cyclohexane, m-phenylene diisocyanate, p-phenylene diisocyanate, 4,4'-diphenyl diisocyanate, 1,5-naphthalene diisocyanate, 4,4'-diphenylmethane diisocyanate (MDI), crude diphenylmethane diisocyanate, 2,4- or 2,6-tolylene diisocyanate, 4,4'-toluidine diisocyanate, dianidine diisocyanate, 4,4'-diphenylether diisocyanate, 1,3- or 1,4-xylylene diisocyanate, ω,ω'-diisocyanate-1,4-diethylbenzene, and the like.

The reaction of the polyol with an excess amount of the polyisocyanate compound is carried out under usual conditions, for example, in case that the polyether polyol is used as the polyol, by heating a mixture of the polyether polyol and the polyisocyanate at a temperature of 70° to 90° C. for 0.5 to 5 hours.

The gelling agent used in the adhesive of the present invention may be any gelling agent in so far as it enhances the temperature-sensitivity of viscosity of the urethane prepolymer. A preferable gelling agent is N-lauroyl-L-glutamic acid-α,γ-di-n-butylamide having the formula:

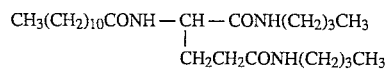

This suitable gelling agent is commercially available, for example, from Ajinomoto Kabushiki Kaisha under the trade name "GP-1".

The amount of the gelling agent used in the adhesive ranges from 0.01 to 5%, preferably from 0.05 to 1.0%, based on the whole amount of the adhesive. When the gelling agent is used in an amount of less than 0.01%, the initial adhesive strength is not enhanced, and when the amount is over 5%, a storage stability is decreased.

In another aspect of the present invention, the one-part moisture-curing urethane adhesive of the present invention comprises a urethane prepolymer as a main component supplemented with a gelling agent and a thermoplastic urethane multi-block copolymer resin. The thermoplastic urethane multi-block copolymer resin used in the adhesive of the present invention is prepared by reacting a polyfunctional ring-containing and active hydrogen-containing compound, and a diol or triol compound with an equivalent or excess amount of a polyisocyanate compound.

The polyfunctional ring-containing and active hydrogen-containing compound has usually a weight average molecular weight of 100 to 4,000, preferably 400 to 2,000, and includes, for example, bisphenol resins, terpene resins, coumarone resins, xylene resins, rosin resins, rosin ester resins, styrene resins, phenol resins, terpene phenol resins, polyester resins, and the like. The diol compound includes, for example, ethylene glycol, 1,4-butanediol, 1,6-hexanediol, 1,8-octanediol, polycarbonate diol, polytetramethylene glycol, hydrogenated butadienediol, polyacryldiol, polyoxyalkylene ether diol, polyoxyalkylene-adduct bisphenol, and other active hydrogen-containing compound. The triol compound includes, for example, trimethylolpropane, glycerin, triethylene triol, polyoxyalkylene ether triol, and the like. The polyisocyanate compound includes all the above-mentioned compounds, but in view of increasing the aggregation energy of urethane and particularly safety and cost, MDI is the most preferable.

The thermoplastic urethane multi-block copolymer resins thus prepared are commercially available, for example, in the name of "Thermoplastic Resin Toyo Ace U-B" manufactured by K.K. Toyo Chemical Research Institute, which has a melting point of 70° to 100° C.

The thermoplastic urethane multi-block copolymer resin is effective for exhibiting the initial adhesive strength of the adhesive. Besides, the copolymer has urethane bond and ring compound residue in the molecule, by which the aggregation energy is exhibited and can show thermoplastic properties. Moreover, since it has a polarity due to the ring compound residue and urethane bond, it can show good compatibility with the above urethane prepolymer.

In still another embodiment of the present invention, the one-part moisture-curing urethane adhesive of the present invention comprises a urethane prepolymer as a main component supplemented with a gelling agent, a thermoplastic urethane multi-block copolymer resin and a thixotropic agent selected from the group consisting of a hydrophilic colloidal silica and a polysiloxane-polyoxyalkylene copolymer.

The hydrophilic colloidal silica used in the present invention excludes a hydrophobic product having $CH_3$ group on the surface. The hydrophilic colloidal silica is commercially available, for example, in the name of U-200 and U-300 (both manufactured by Nippon Aerosil Kabushiki Kaisha, Japan).

The polysiloxane-polyoxyalkylene copolymer is a known compound, for example, a compound of the formula:

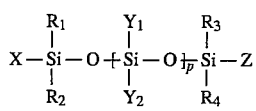

wherein $R_1$, $R_2$, $R_3$ and $R_4$ are the same or different and are each methyl or phenyl;

p is an integer of 0 to 70, preferably 10 to 30;

either one of X and Z is a polyoxyalkylene-containing group of the formula:

wherein q is an integer of 1 to 4, preferably 2 or 3; a is an integer of 0 to 50, preferably 0 to 10; b is an integer of 10 to 100, preferably 20 to 50; and $R_5$ is hydrogen atom, an alkyl having 1 to 8 carbon atoms (e.g. methyl, ethyl, propyl, butyl, pentyl, etc.), or an alkylcarbonyl having 1 to 18 carbon atoms (e.g. acetyl, propionyl, butyroyl, etc.); and when a is not less than 1, the group: $C_3H_6O$ and the group: $C_2H_4O$ may bind mutually in any order, and another X and Z is methyl, phenyl, or a polyoxyalkylene-containing group of the above formula [a];

$Y_1$ and $Y_2$ are the same or different and are each methyl, phenyl, or a polyoxyalkylene-containing group of the above formula [a], and when p is 2 or more, these $Y_1$ and $Y_2$ may be different group in each repeating unit.

The polysiloxane-polyoxyalkylene copolymer has usually a molecular weight of about 500 to 30,000, and is commercially available, for example, in the name of "Formate" (manufactured by Takeda Chemical Industries, Ltd., Japan).

In addition to the urethane prepolymer, the gelling agent and the thermoplastic urethane multi-block copolymer, the adhesive of the present invention may further optionally contain a plasticizer [e.g. dioctyl phthalate (DOP), trioctyl trimellitate (TOTM), dioctyl adipate, dibutyl sebacate, trischloroethyl phosphate, chloroparaffins, etc.]; a filler [e.g. carbon black, calcium carbonate, talc, barium sulfate, etc.]; a curing catalyst [e.g. dibutyl tin dilaurate (DBTDL), tin octoate, lead octoate, etc.]; a coloring agent; a thixotropic agent (e.g. fine powder silica, etc.); a stabilizing agent, and the like. In this case, the gelling agent is preferably dissolved in the plasticizer with heating at 60° to 120° C. and the obtained solution (usually containing 0.2 to 5% of the gelling agent) is added.

The plasticizer may be contained in an amount of up to 30% by weight and the filler may be contained in an amount of up to 60% by weight based on the whole amount of the adhesive. Other additives such as the curing catalyst, the coloring agent, the stabilizing agent and the like may be contained in an amount of up to 10% by weight based on the whole amount of the adhesive.

The adhesive of the present invention can be used as a hot apply type adhesive due to the addition of the gelling agent, i.e. the adhesive is applied at a temperature of 50° to 100° C. and, with cooling of the adhesive, a viscosity of the adhesive increases to give a desired initial adhesive strength. This allows for prevention of float or slippage of glass in the adhesive application of window glass of automobiles.

The present invention is explained in more detail by means of the following Example and Reference Example but should not be construed to be limited thereto.

EXAMPLE 1

(1) Preparation of a solution of a gelling agent:

To 30 parts (parts by weight, hereinafter the same) of DOP is added 0.6 parts of a gelling agent (GP-1) and the mixture is stirred at 80° to 100° C. for 30 minutes to give a solution of a gelling agent.

(2) Synthesis of a urethane prepolymer:

To a polyoxypropylene triol (MW: 7000; 3000 g) is added MDI (350 g) and the reaction is conducted under nitrogen atmosphere at 80° C. for 3 hours to give a urethane prepolymer having a free NCO content of 2.3 and a viscosity of 38,000 cps (20° C.).

(3) Preparation of an adhesive:

To 100 parts of the urethane prepolymer prepared in the above process (2) are added 30.6 parts of the solution of a gelling agent prepared in (1), 20 parts of TOTM, 100 parts of a dry carbon black, 30 parts of calcium carbonate and 0.1 parts of DBTDL and the mixture is stirred under reduced pressure to give a one-part moisture-curing urethane adhesive (the amount of the gelling agent in the whole amount of the adhesive is 0.21%).

EXAMPLE 2

To 100 parts of the urethane prepolymer prepared in the process (2) of Example 1 are added 30.6 parts of the solution of a gelling agent prepared in the process (1) of Example 1, 15 parts of a thermoplastic urethane multi-block copolymer resin (Thermoplastic Resin Toyo Ace U-B), 20 parts of TOTM, 100 parts of a dry carbon black, 30 parts of calcium carbonate and 0.1 parts of DBTDL and the mixture is stirred under reduced pressure to give a one-part moisture-curing urethane adhesive.

EXAMPLE 3

To 100 parts of the urethane prepolymer prepared in the process (2) of Example 1 are added 30.6 parts of the solution of a gelling agent prepared in the process (1) of Example 1, 15 parts of a thermoplastic urethane multi-block copolymer resin (Thermoplastic Resin Toyo Ace U-B), 1.5 parts of a thixotropic agent (Formate ST), 20 parts of TOTM, 100 parts of a dry carbon black, 30 parts of calcium carbonate and 0.1 parts of DBTDL and the mixture is stirred under reduced pressure to give a one-part moisture-curing urethane adhesive.

Reference Example 1

The procedures of Example 1 are repeated using the same components as in Example 1 except the gelling agent (GP-1) (0.6 parts) which is not used in this Example to give an adhesive.

Results of Experiment

A viscosity at 60° C., a tack free time (T.F.T.) (20° C., 65% RH) and an initial shearing adhesive strength (tensile speed: 50 mm/minute) measured for the adhesives of Examples 1 to 3 and Reference Example 1 are shown in the following Table 1.

TABLE 1

|  | Ex. 1 | Ex. 2 | Ex. 3 | Ref.Ex. 1 |
| --- | --- | --- | --- | --- |
| Viscosity (60° C., poise) | 900 | 1000 | 1000 | 700 |
| T.F.T. (minutes) | 30 | 30 | 30 | 30 |
| Initial shearing adhesive strength (kgf/cm$^2$) | 0.2 | 0.3 | 0.3 | 0.1 |

What is claimed is:

1. A moisture-curing one-part urethane adhesive comprising
   (a) a urethane prepolymer which is the reaction product of a polyol and an excess amount of polyisocyanate, wherein the prepolymer has isocyanate groups at the terminus,
   (b) 0.01 to 5% by weight based on the total weight of the adhesive of N-lauroyl-L-glutamic acid-α,γ-di-n-butylamide as a gelling agent
   (c) a plasticizer,
   (d) a filler,
   (e) a curing catalyst, and optionally
   (f) a thermoplastic urethane multi-block copolymer resin which is prepared by reacting a polyfunctional ring-containing and active hydrogen-containing compound, and a diol or triol compound with an equivalent or excess amount of a polyisocyanate compound.

2. The adhesive of claim 1 which comprises 20 to 60% by weight of the urethane prepolymer, and up to 20% by weight of the thermoplastic urethane multi-block copolymer resin.

3. The adhesive of claim 1, wherein the thermoplastic urethane multi-block copolymer resin (f) is present in an amount effective to increase the initial adhesive strength of the adhesive.

4. The adhesive of claim 1, wherein the urethane prepolymer contains 1 to 10% by weight of the prepolymer of NCO group at the terminus.

5. The adhesive of claim 1, wherein the amount of said gelling agent is 0.05 to 1.0% by weight based on the whole weight of the adhesive.

6. The adhesive of claim 1 which further comprises a thixotropic get.

7. The adhesive of claim 6 which comprises said thixotropic agent in an amount of up to 5% by weight.

8. The adhesive of claim 6, wherein the thermoplastic urethane multi-block copolymer resin (f) is present in an amount effective to increase the initial adhesive strength of the adhesive.

9. The adhesive of claim 6, wherein the thixotropic agent comprises hydrophilic colloidal silica.

10. The adhesive of claim 6, wherein the thixotropic agent comprises a polysiloxane-polyoxyalkylene copolymer.

11. The adhesive of claim 8, wherein the thixotropic agent comprises hydrophilic colloidal silica.

12. The adhesive of claim 8 wherein the thixotropic agent comprises a polysiloxane-polyoxyalkylene copolymer.

13. The adhesive of claim 1, wherein the filler comprises one or more of carbon black, calcium carbonate, talc, and barium sulfate.

14. The adhesive of claim 1, wherein the plasticizer comprises one or more of dioctyl phthalate, trioctyl trimellitate, dioctyl adipate, dibutyl sebacate, trischloroethyl phosphate, and chloroparaffins.

15. The adhesive of claim 1, wherein the curing catalyst comprises one or more of dibutyl tin dilaurate, tin octoate, and lead octoate.

16. The adhesive of claim 1, wherein the curing catalyst comprises dibutyl tin dilaurate, the filler comprises carbon black and calcium carbonate, and the plasticizer comprises dioctyl phthalate and trioctyl trimellitate.

* * * * *